United States Patent
Hillyard et al.

(10) Patent No.: US 9,489,652 B1
(45) Date of Patent: Nov. 8, 2016

(54) OBTAINING AND RUNNING A LOCAL QUERY ON A COMPUTING DEVICE

(75) Inventors: Paul Byron Hillyard, Lindon, UT (US); Mark Bird, Highland, UT (US)

(73) Assignee: Crimson Corporation, Dover, DE (US)

(*) Notice: Subject to any disclaimer, the term of this patent is extended or adjusted under 35 U.S.C. 154(b) by 183 days.

(21) Appl. No.: 13/484,077

(22) Filed: May 30, 2012

(51) Int. Cl.
*G06F 17/30* (2006.01)
*G06Q 10/08* (2012.01)
*G06Q 20/20* (2012.01)

(52) U.S. Cl.
CPC .......... *G06Q 10/087* (2013.01); *G06Q 20/203* (2013.01)

(58) Field of Classification Search
CPC ............. G06F 3/067; G06F 17/302; G06F 17/30221; G06F 11/3612; G06F 21/6218; G06F 2221/2141; G06F 2221/2145; G06F 9/445; G06F 17/30371; G06F 8/61; G06F 8/71; G06F 9/44; G06F 15/161; G06F 9/5088; G06F 8/65; G06F 11/1433; G06F 11/3051; G06F 8/60; G06F 17/30657; G06F 15/177; G06F 17/30289; H04L 67/34; H04L 67/42; H04L 43/12; H04L 41/0213; H04L 41/046; H04L 41/20; H04L 41/082; G06Q 20/203; G06Q 10/00; G06Q 10/087
USPC ........................................ 707/769, 740, 949
See application file for complete search history.

(56) References Cited

U.S. PATENT DOCUMENTS

| | | | |
|---|---|---|---|
| 7,051,114 B1* | 5/2006 | Ravishankar et al. | 709/245 |
| 8,150,961 B1* | 4/2012 | Bird | G06Q 10/087 709/219 |
| 2003/0149714 A1* | 8/2003 | Casati et al. | 709/100 |
| 2004/0044996 A1* | 3/2004 | Atallah | 717/169 |
| 2005/0097199 A1* | 5/2005 | Woodard et al. | 709/223 |
| 2005/0278395 A1* | 12/2005 | Sandaire | 707/203 |
| 2007/0226249 A1* | 9/2007 | Kacin et al. | 707/102 |
| 2008/0040395 A1* | 2/2008 | Danoyan | 707/200 |
| 2008/0189326 A1* | 8/2008 | Norrie | G06F 8/60 |
| 2009/0164495 A1* | 6/2009 | MacLeod | H04L 12/24 |
| 2009/0265701 A1* | 10/2009 | Naslavsky | G06F 8/61 717/172 |
| 2010/0106742 A1* | 4/2010 | Guruswamy | H04L 41/12 707/773 |

* cited by examiner

Primary Examiner — Evan Aspinwall
(74) Attorney, Agent, or Firm — Austin Rapp & Hardman (57) ABSTRACT

A computing device that is configured for running a query on inventory information is described. The computing device includes a processor and instructions stored in memory that is in electronic communication with the processor. The computing device obtains inventory data. The computing device also obtains a query corresponding to the computing device. The computing device runs the query on the inventory data. The computing device further determines whether the query returns a record. The computing device additionally obtains a task corresponding to the query if a record is returned.

17 Claims, 8 Drawing Sheets

OBTAINING AND RUNNING A LOCAL QUERY ON A COMPUTING DEVICE

TECHNICAL FIELD

The present disclosure relates generally to computers and computer-related technology. More specifically, the present disclosure relates to obtaining and running a local query on a computing device.

BACKGROUND

Computer and communication technologies continue to advance at a rapid pace. Indeed, computer and communication technologies are involved in many aspects of a person's day. Computers commonly used include everything from hand-held computing devices to large multi-processor computer systems.

Computers are used in almost all aspects of business, industry and academic endeavors. More and more homes are using computers as well. The pervasiveness of computers has been accelerated by the increased use of computer networks, including the Internet. Many computers may be connected to such networks. These computers are often referred to as nodes. One or more servers or computers may provide data, services and/or may be responsible for managing other computers on the network. A computer network may include hundreds or even thousands of nodes.

A computer may often be overloaded with too many processes. For example, where a computer communicates with computing devices over a network, the computer may have to perform multiple operations with regard to each of the computing devices on the network. Where a computer is performing hundreds or thousands of operations for multiple computing devices on a network, it may slow down the computer or in some cases cause certain computer operations to be suspended or aborted. As can be observed from this discussion, systems and methods that help reduce the number of processes performed by a computer on a network may be beneficial.

DETAILED DESCRIPTION

A computing device configured for running a query on inventory information is described. The computing device includes a processor and instructions stored in memory that is in electronic communication with the processor. The computing device obtains inventory data. The computing device further obtains a query corresponding to the computing device. The computing device also runs the query on the inventory data. The computing device also determines whether running the query returns a record. The computing device also obtains a task corresponding to the query if a record is returned.

The computing device may further store the inventory data on a local database of the computing device. The inventory data may be formatted in a dynamic type schema. The inventory data may further include metadata corresponding to the computing device. The metadata may maintain a similar data structure before and after the inventory data is obtained by the computing device.

The computing device may also obtain any additional inventory data. The computing device may run the query on any additional inventory data. The computing device may obtain one or more additional queries and run the one or more additional queries on any additional inventory data. The computing device may also combine the inventory data with the additional inventory data and run the query on the combination of inventory data and additional inventory data. The computing device may also obtain one or more additional queries and run the one or more additional queries on the combination of inventory data and additional inventory data.

The computing device may determine whether a query is not stale. If the query is not stale, the computing device may run the query on the inventory data. The computing device may also determine whether a query is stale. If the query is stale, the computing device may obtain a new query and run the new query on the inventory data.

A method for running a query on inventory data on a computing device is also described. The method includes obtaining inventory data. The method also includes obtaining a query corresponding to the computing device. The method also includes running the query on the inventory data. The method also includes determining whether running the query returns a record. The method also includes obtaining a task corresponding to the query if a record is returned.

A non-transitory tangible computer-readable medium for determining a node status is additionally described. The computer-readable medium includes executable instructions for obtaining inventory data. The computer-readable medium also includes executable instructions for obtaining a query corresponding to the computing device. The computer-readable medium also includes executable instructions for running the query on the inventory data. The computer-readable medium also includes executable instructions for determining whether running the query returns a record. The computer-readable medium also includes executable instructions for obtaining a task corresponding to the query if a record is returned.

The systems and methods disclosed herein may utilize a managed node for offloading the work of determining target information from an administrative core to individual managed nodes. In known systems, cores use a couple Network Technology (NT) services that continually run on an administrative core to map the targets of Data Access Layer (DAL) queries and Lightweight Directory Access Protocol (LDAP) queries. In order to be ready to map a management action or task to a client node that is processing query-based policies, conventional systems require a core to frequently and periodically run each possible query and save the results in a tuple table that maps any management action to individual client machines for processing those management actions.

In mapping these management actions or tasks in known systems, an administrative core would perform one or more queries associated with each management action. In order to prevent unnecessary delay, the administrative core pre-runs these queries associated with each management action and stores identification information of the client nodes to perform each action. When a client node contacts the core through a web service, asking for actions to perform, the administrative core draws upon the table of results of the query and provides the tasks to the client node. By pre-running each of the queries, the core is able to more quickly map the management action to the client node upon request.

Known approaches to mapping management actions to client nodes by pre-running queries on the administrative core uses significant core processing and database bandwidth as the core must frequently re-run each and every query at periodic intervals. Further, in these known systems, the queries must be re-run frequently enough to ensure that target information is not stale. In an environment with thousands of defined tasks and multiple nodes, there will be thousands of queries that need to be processed to determine task targets. This amount of processing can be detrimental to the administrative core and reduce overall efficiency of a system.

In an effort to remedy some of these difficulties, the systems and methods disclosed herein may provide additional processing power to a system by offloading at least some of the work of determining target information from an administrative core to individual managed nodes. For DAL queries, the managed node is the source of most of the information used in the query. In addition, the core may grant access to a managed node to a database with additional information about the node. The managed node may collect the information and store it in a local inventory, later accessing it via a DAL query. Additional information provided by the core may be flagged as special by the core, and packaged up and made available for download when the managed node is about to perform a DAL query.

The DAL may provide an interpreter that permits representing object hierarchy in a relational database. In one example, the DAL is an interpreter that uses a proprietary grammar defined using Bakus-Nauer Form (BFN). The interpreter may take proprietary grammar and use metadata in a database and interpret the grammar into Structured Query Language (SQL). Differences in SQL implementations may be taken into account within the interpreter itself.

In offloading the work from an administrative core to a managed node, the systems and methods described herein may use a variety of approaches for running queries and mapping tasks to a managed node. For example, the managed node may perform an inventory scan, reporting the data to the administrative core. The managed node may further place the data in a local database. In storing the data, the managed node may use the same schema used by the core itself to store the information. In some configurations, the managed node may use a copy of the inventory service running just on itself. Distributing some of the storage and processing to a managed node may result in a more efficient distribution of work than known systems.

In one example, the inventory data is stored in a dynamic type schema. By doing this, the inventory data has much fewer tables and is less susceptible to schema creep from version to version. In some configurations, the managed node could also store a last changed record associated with every inventory attribute that it stores in its local copy of the database. By using a dynamic type schema, it may be useful in some managed nodes that may more quickly use cached query results than re-process individual queries, which may be required more often in other data type schemas. Further, by using a dynamic schema, inventory data and other data may be stored with unknown properties that may be determined at a later time. In one example, storing inventory data in a dynamic type schema may include storing the data in a table as one or more strings of data. For instance, in a relational database, each piece of data typically has a specific table and column in which it is stored. However, the ability may be needed to store objects that are unknown at design time. Thus, items may be stored in a single table as strings. Accordingly, a dynamic schema may be utilized in some configurations, where initially there may be no specific location for data in a well-designed table.

In one example, the schema is a relational schema. The schema may include metadata that permits the computing device to extend the underlying schema of the inventory data, queries, tasks or other data without changing the structure of the metadata. The DAL may make use of the metadata to find data in the schema and correctly interpret the SQL. The computing device may further maintain a similar structure for the metadata when inventory data and/or other data is transferred between devices.

Prior to requesting a task to perform, one proposed approach would be for the managed node to download the latest copy of additional inventory data maintained by the administrative core and integrate the additional data with the data on the local database. The managed node could download a list of all possible queries that the administrative core would otherwise have had to run on behalf of the managed node. Instead of storing and maintaining the queries entirely on the administrative core, the managed node would download the list of queries to run on the managed node. In some configurations, the managed node would download only the queries that are new or changed since the previous time the queries were processed.

In one approach, the managed node runs the query on its own local inventory database. In some configurations, by running the queries, the managed node may be able to tell whether any of the previous query results are stale by comparing any changes to the inventory data. In this case, the managed node would be able to limit processing by only re-running the stale queries and maintaining the previous results from non-stale queries run earlier. In some approaches, the queries may have already been converted from a DAL format into a Structured Query Language (SQL) format by the administrative core based on the core's knowledge of the database schema used by the managed node. In the dynamic type schema approach, some of the possible query format conflicts, such as interfacing between different possible schema versions created over time, may be avoided because the dynamic type schema doesn't evolve over time.

When a query determines that a managed node should perform a specific task, the query will return a record. Where a managed node is running one or more queries, the managed node will generally only run queries on behalf of the managed node itself. For each query that returns a record for the managed node, the managed node may download or obtain from the administrative core a list of tasks associated with the query that resulted in the return. In some configurations, the query may also include one or more tasks corresponding to the managed node as part of a document that contains the SQL to execute. For example, if a query returns a record to apply a task to a managed node, the managed node may obtain the task from the same document or source as the query. In some instances, the managed node may download patches or other data (e.g., .exe, .msi, etc.) from another node (e.g., peer) rather than a core server. Where a specific managed node is running a query, the process is simpler than when performed on the core, where multiple nodes are accounted for on a tuple table. The managed node may then process each of the tasks provided by the core.

In one approach, the local database on the managed node may be incomplete or missing. In this approach, the managed node may ask the administrative core whether it belongs to each query. This inquiry may be made via a bulk request or several single requests. This may result in the administrative core to perform some or all of the queries and cache the results, but would be performed on demand regarding specific queries as it pertains to a requesting node. This would avoid a certain amount of processing on the administrative core because rather than querying data periodically with high enough frequency to avoid stale data, the core would process the data on demand and with regard to specific queries as it pertains to the requesting node. Further, in using LDAP queries on this approach, an on-demand single LDAP query representative may result in improved efficiency. While the LDAP query requires access to an LDAP server, thereby requiring individual nodes to run the same query, by using an LDAP query approach, the queries would still be run on-demand and then cached for a period of time, avoiding the periodic re-runs of the queries on the administrative core. While these on-demand approaches require some or all of the queries to be run on the administrative core, they may still result in a more efficient method for mapping tasks to managed nodes on a network and result in improved server performance by offloading the periodic queries from the administrative core. This may result in the ability of the administrative core to support far more managed nodes.

Various configurations of the systems and methods are now described with reference to the Figures, where like reference numbers may indicate identical or functionally similar elements. The configurations of the present systems and methods, as generally described and illustrated in the Figures herein, could be arranged and designed in a wide variety of different configurations. Thus, the following more detailed description of several configurations, as represented in the Figures, is not intended to limit the scope of the systems and methods, as claimed, but is merely representative of the various configurations of the systems and methods.

Figure 1:
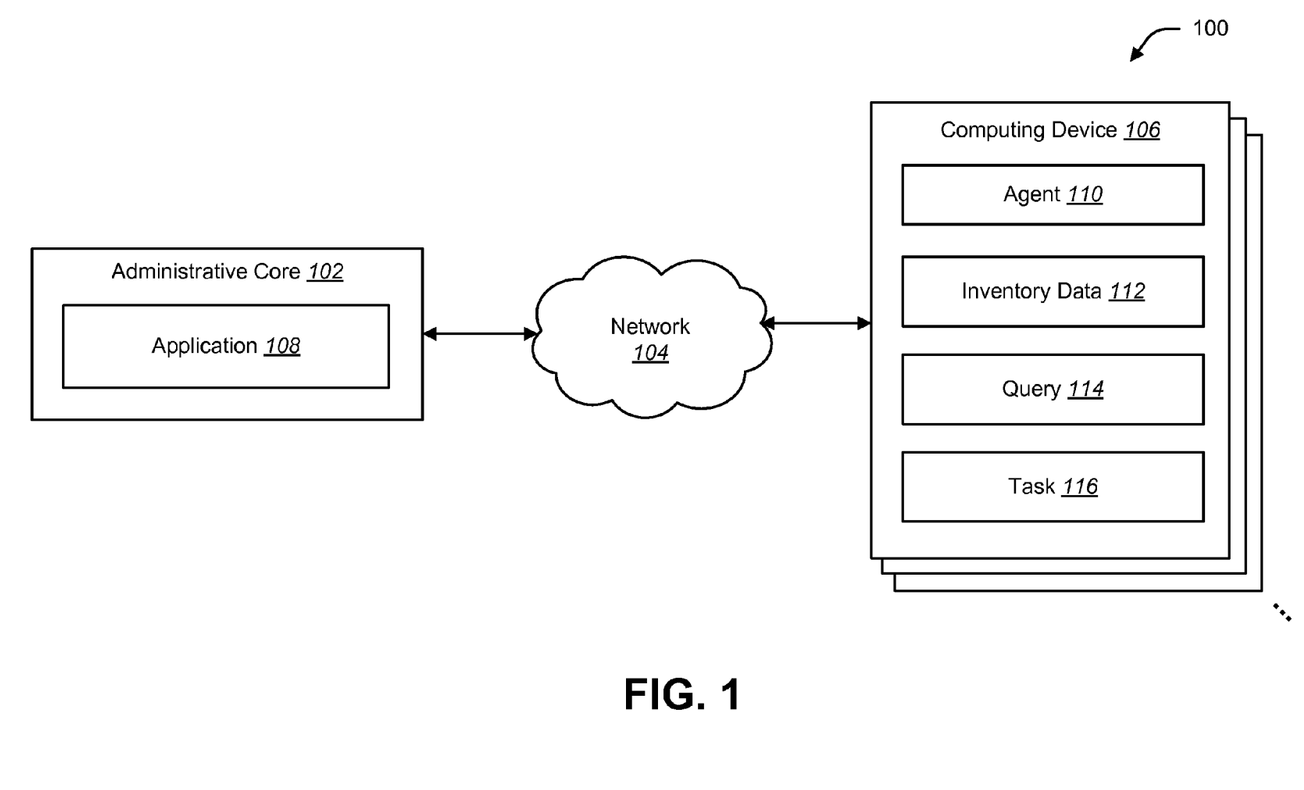
FIG. 1 is a block diagram illustrating one configuration of a system where systems and methods for obtaining and running a local query on a computing device may be implemented.

FIG. 1 is a block diagram illustrating one configuration of a system 100 where systems and methods for obtaining and running a local query on a computing device may be implemented. One or more computing devices 106 are illustrated in FIG. 1. Examples of the computing device 106 include servers, personal computers (PCs) or other kinds of computing devices. The computing device 106 may include an agent 110. The agent 110 may be hardware and/or software implemented to receive and execute instructions over a network 104. In one configuration, the agent 110 may be configured to receive instructions and data from an administrative core 102. For example, the agent 110 may be installed on a computing device 106 to interface with the administrative core 102 or to run (e.g. execute) processes or tasks on the computing device 106. The agent 110 may further be configured to receive and process data in a variety of formats and schemas.

The illustrated system 100 also includes an administrative core 102. Examples of the administrative core 102 include servers, PCs, computing devices and other devices capable of communicating with another device and/or transmitting data over a network. The administrative core 102 may further include an application 108. The application 108 may include hardware and/or software used to multicast or distribute data to one or more computing devices over a network 104. Further, the application 108 may be used to install and/or interface with an agent 110 on a computing device 106.

The computing device 106 may communicate with other computing devices or an administrative core 102 over a network 104. The network 104 may be a computer network such as a Local Area Network (LAN), Wide Area Network (WAN), Internet, Intranet, or other medium for transferring data between various devices. In various configurations, any number of computing devices may be connected to the network 104. In some configurations, one or more databases may be accessible to a computing device 106 over the network 104.

The computing device 106 may include various types of data. For example, the computing device 106 may include inventory data 112 corresponding to the computing device 106. The inventory data 112 may include information about the computing device 106, including status of the computing device 106, Internet Protocol (IP) address or other identifying information, specifications, hardware, software, updates, or other information related to the computing device 106 or programs and other software on the computing device 106. In one configuration, the inventory data 112 is held locally on the computing device 106 and stored on a database. Alternatively, the inventory data 112 may be found on a storage device external to the computing device 106, such as on the administrative core 102 or on another device accessible to the computing device 106 over the network 104. In one configuration, the computing device 106 may obtain inventory data 112. In some configurations, the computing device 106 may maintain the inventory data 112 on one or more databases. In some configurations, all or part of the inventory data 112 may be obtained and/or stored on a database local to the computing device 106. In other configurations, all or part of the inventory data 112 may be obtained from one or more databases external to the computing device 106.

The inventory data 112 may come in a variety of formats and/or schemas. In one configuration, the inventory data 112 may be stored and/or maintained in one or more tables. Further, the data may be maintained in a variety of different formats, structures, and schemas. For example, in one configuration, the inventory data 112 is a dynamic data type schema. By using a dynamic type schema, the inventory data 112 is less susceptible to schema creep from version to version as transferred or reformatted between devices. Further, while some data types require more overall storage space, and may in some cases vary in efficient use of storage and memory, the total number of records on a computing device 106, including inventory data 112, will be small in comparison to a central computer or a device (e.g. administrative core 102) holding inventory data 112 for multiple devices on a network 104. In some embodiments, the inventory data 112 may be obtained from an administrative core 102 or other external device. In these cases, the computing device 106 may be configured to maintain the inventory data 112 in a similar format to the device which provides the inventory data 112 to the computing device 106. In other configurations, the inventory data 112 may be reformatted or otherwise changed upon obtaining the inventory data 112.

Additionally, the inventory data 112 may include information about one or more attributes of a device. In some examples, the inventory data 112 may include thousands of attributes about one or more devices. For instance, inventory data 112 may include information about a device name, IP address, number of hard drives or the size, speed, manufacturer and/or other information about each hard drive. Further, inventory data 112 may provide information about memory, software, firewalls, history, anti-virus software, specifications and other data related to a device and/or any software or programs on one or more devices. In some configurations, inventory data 112 may include any data that may be detected during an inventory scanning process.

The computing device 106 may further include one or more queries 114 corresponding to the computing device 106. Examples of a query 114 include a scan, request, policy, or other operation or inquiry applied to data (e.g. inventory data 112). In some configurations, the computing device 106 may store a query 114 on a database local to the computing device 106. Similar to obtaining the inventory data 112, the computing device 106 may obtain one or more queries from multiple sources, such as an internal database, or another source accessible over the network 104. In some configurations, a query 114 may be held and/or maintained on an administrative core 102 accessible to the computing device 106 or any other device in communication with the administrative core 102. In these cases, one method of obtaining the query 114 would be to download the query 114 over the network 104 and store the query 114 on the computing device 106. In some configurations, the administrative core 102 may create a query 114 in response to a request by a computing device 106. In other configurations, the query 114 may be created and/or stored locally on the computing device 106. The query 114 corresponding to the computing device 106 may be obtained by a computing device 106 and run on the inventory data 112.

In one configuration, the computing device 106 is configured to run the query 114 on the inventory data 112. For example, the computing device 106 may run the query 114 on the inventory data 112 stored on a local database. If the query 114 returns a record, then the computing device 106 may be configured to obtain a task 116 corresponding to the query 114. For example, where a query 114 is run on inventory data 112 and returns a record that satisfies the query 114, this may indicate that a corresponding task 116 should be processed and/or executed on the computing device 106. In another example, where a query 114 is run on inventory data 112 and does not return a record, this may indicate that a task 116 corresponding to the query 114 need not be performed by the computing device 106.

The computing device 106 may further include one or more tasks 116. Examples of a task 116 include an operation, upload, download, update and one or more processes to be performed by a computing device 106. In some configurations, a task 116 may be processed and/or executed by one or more computing devices. Further, a task 116 may be created by a computing device 106 or alternatively created by an administrative core 102 or other device in communication with the network 104. Similar to the inventory data 112, a query 114 and/or task 116 may be stored locally or external to the computing device 106. In one configuration, the computing device 106 stores one or more queries and tasks 116 on a local database. In another configuration, the computing device 106 may access a query 114 and/or task 116 on an external database accessible over the network 104. In one configuration, for example, a query 114 corresponding to the computing device 106 may be stored on a database local to the computing device 106 while a task is stored on another database.

When running a query 114, the computing device 106 determines whether running the query 114 returns a record. In one configuration, a record may be any part of the inventory data 112 that satisfies the query 114. In another configuration, the record may be a copy or subset of any part of the inventory data 112. In another configuration, a record may be a reference or indicator to a piece of the inventory data 112 that satisfies the query 114. In some configurations, the computing device 106 may be configured to obtain or compile one or more records that satisfy one or more queries 114 and maintain records corresponding to the queries 114 on the computing device 106. In one configuration, the computing device 106 may send one or more records to an administrative core 102. In some configurations, where running the query 114 results in a return of a record, the computing device 106 may be configured to obtain a task 116 corresponding to the query 114. If running the query 114 fails to return a record, the computing device 106 may be configured to discard the query 114, request another query 114 or perform another predetermined response to receiving or not receiving a record corresponding to a query 114.

Figure 2:
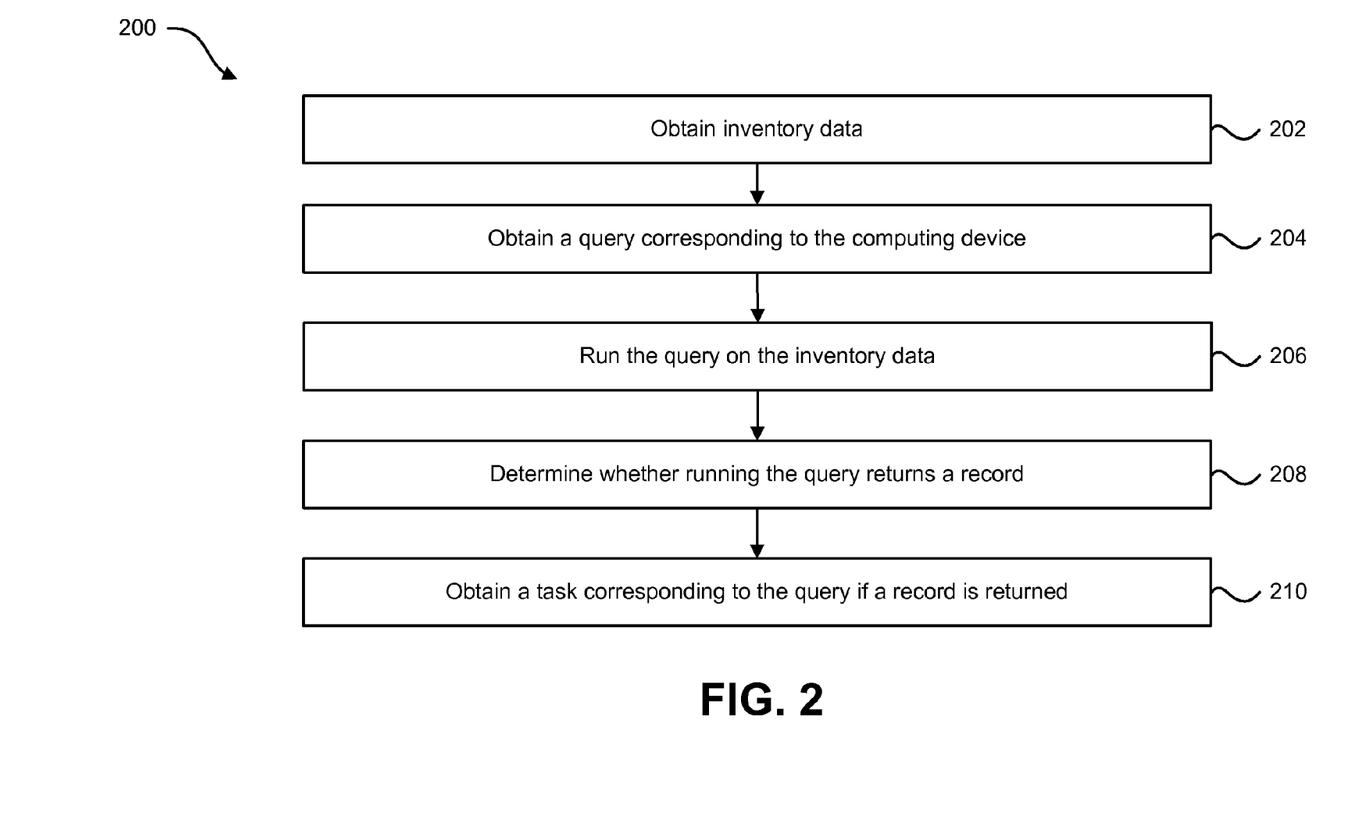
FIG. 2 is a flow diagram illustrating a configuration of a method where systems and methods for obtaining and running a local query on a computing device may be implemented.

FIG. 2 is a flow diagram illustrating a configuration of a method 200 where systems and methods for obtaining and running a local query 114 on a computing device 106 may be implemented. The computing device 106 may obtain 202 inventory data 112. As discussed in some detail herein, the inventory data 112 may be obtained from different sources and/or may be in a variety of formats. For example, in one configuration, the inventory data 112 may be obtained internally from the computing device 106. In other configurations, the inventory data 112 may be obtained from an administrative core 102 or other device external to the computing device 106. Also, the inventory data 112 may be stored or maintained in a variety of forms. In one example, the inventory data 112 is formatted in a dynamic type schema. In another example, the inventory data 112 is configured to maintain the same schema throughout the method 200. In another example, the computing device 106 may be configured to maintain any inventory data 112 in the same schema prior to being obtained by the computing device 106.

In one configuration, the computing device 106 may obtain 204 a query 114 corresponding to the computing device 106. As discussed in some detail herein, the query 114 may be obtained from a source internal to the computing device 106 such as an internal database. In another configuration, the query 114 is stored and/or maintained on an administrative core 102 or other external device on the network 104. The computing device 106 may be configured to obtain 204 the query 114 from another source by way of accessing an internal or external database, sending an inquiry, or otherwise indicating to another device a request for one or more queries. In some configurations, the computing device 106 may be configured to obtain 204 multiple queries and maintain or store those queries on the computing device 106.

The computing device 106 may further be configured to run 206 the query 114 on the inventory data 112. As discussed in some detail herein, some examples of a query 114 may include a scan, request, policy or other operation or inquiry applied to data, such as inventory data 112. Running the query 114 on the inventory data 112 may be to determine the current status of the computing device 106 and/or whether further operations should be done on the computing device 106 or on the inventory data 112. In some examples, the query 114 may be run on the inventory data 112 to determine if the inventory data 112 is up to date, whether certain software on the computing device 106 is currently running or up to date. Another example of running a query 114 is a running a policy to determine the status of the computing device 106 or presence or absence software on the computing device 106. Accordingly, running a query 114 may be performed for many reasons, including those examples described herein.

In some configurations, the computing device 106 may determine 208 whether running the query returns a record. One example of a record includes a piece of data (e.g. inventory data) that satisfies a query 114. A record may also be a copy of inventory data 112 or subset of inventory data 112 corresponding to a query 114. In some configurations, the record may include a reference to inventory data 112 corresponding to a query 114. In some configurations, a record may be any data that satisfies a particular query 114.

The computing device may obtain 210 a task 116 corresponding to the query if a record is returned. A task 116 may include an operation, upload, download, update or one or more processes to be performed by a computing device 106 or other device. A task 116 may be obtained from a database on the computing device 106 or from another source, such as an administrative core 102 or other external device on the network 104. In some configurations, one or more tasks may be obtained from multiple sources. For example, where a computing device 106 obtains multiple queries and tasks associated with those queries, one or more tasks may be obtained from a local database on the computing device 106 while one or more tasks and other queries are obtained from other devices on the network 104. Further, while a query 114 may be found on the computing device 106, a corresponding task 116 may be found on an external device on the network 104. In another example, where a task 116 is obtained from the computing device 106, a corresponding query 114 may be obtained from another device.

Figure 3:
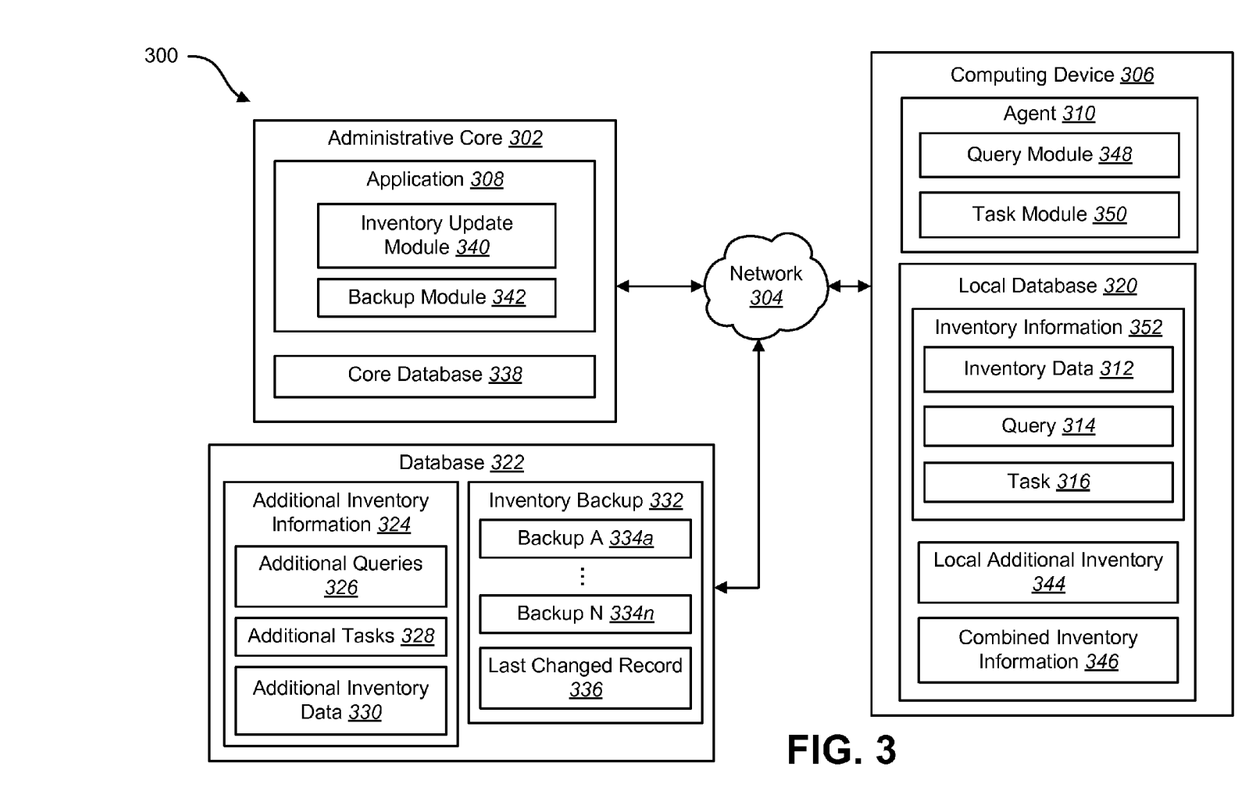
FIG. 3 is a block diagram illustrating another configuration of a system where systems and methods for obtaining and running a local query on a computing device may be implemented.

FIG. 3 is a block diagram illustrating another configuration of a system 300 where systems and methods for obtaining and running a local query 314 on a computing device 306 may be implemented. The system 300 may include a computing device 306. Some examples of computing devices have been discussed herein. In some configurations, the computing device 306 may be a managed node in communication with other nodes or administrative core 302 over a network 304. The system 300 may include any number of computing devices 306 or nodes that may perform one or more of the processes discussed herein.

The computing device 306 may further include an agent 310. The agent 310 may be hardware and/or software used to receive and execute instructions over a network 304. In one configuration, the agent 310 may include a query module 348. The query module 348 may be configured to obtain and run one or more queries on a computing device 306. For example, a query module 348 may be configured to create and store a query 314 on the computing device 306. In another configuration, the query module 348 may be configured to interface with another device on the network 304, such as an administrative core 302. In some configurations, the query module 348 may retrieve a query 314 for running on inventory data 312 maintained or otherwise accessible to the computing device 306. Further, in some configurations, after obtaining inventory data 312 and one or more queries, the query module 348 may be configured to run one or more queries on inventory data 312.

The agent 310 may further include a task module 350. The task module 350 may be configured to receive and process one or more tasks on a computing device 306. For example, in some configurations, the task module 350 may be configured to obtain a task 316 corresponding to a query 314 on the computing device 306. In another configuration, the task module 350 may retrieve a task from another device on the network 304, such as an administrative core 302. Upon obtaining one or more tasks, the task module 350 may further be configured to process and/or execute each task on the computer device 306. In some configurations, the agent 310 may include both the query module 348 and the task module 350. In other configurations, the agent 310 may include other components that perform some or all of the processes discussed herein in relation to the query and task modules 348, 350.

The computing device 306 may further include a local database 320. Some examples of a local database 320 include a database physically attached to the computing device 306. Another example of a local database 320 may be a database directly accessible to the computing device 306. The local database 320 may be used by the computing device 306 to store or provide access to inventory information 352, including inventory data 312 and one or more queries and tasks. In some configurations, the inventory information 352 may be entirely on the local database 320. In another configuration, some inventory information 352, such as the inventory data 312 may be on the local database 320 while other information, such as a query 314 or task 316, is located on another database accessible to the computing device 306. Other configurations may include certain tasks and/or queries on the local database 320 with one or more tasks and/or queries on another database.

In some configurations, the system 300 may include a database 322 accessible over the network 304. In some configurations, the database 322 is separate from the computing device 306 and administrative core 302, as illustrated. In other configurations, the database 322 may be part of an administrative core 302. In another configuration, the database 322 may be local to the computing device 306 or easily accessible to the computing device 306. The database 322 may include additional inventory information 324 and an inventory backup 332. The additional inventory information 324 may be any inventory information, including some or all of the inventory information 352 on the local database 320. The additional inventory information 324 may include one or more additional queries 326, one or more additional tasks 328 and additional inventory data 330.

In one example, the additional inventory information 324 may include any data that is not automatically detected during an inventory scanning process. Additional inventory information 324 may be added by a user, third party application or other application. For instance, additional inventory information 324 may include the physical location of a computing device 306. In one example, a third party application may obtain an asset tag and/or manufacturer from a source of inventory data and download warranty information from a manufacturer or website for a particular computing device 306. Additional inventory information 324 may include one or more attributes that may not be detected on an initial inventory scan by a computing device 306. In some configurations, additional inventory information 324 may include thousands of attributes about a computing device 306 or information related to a computing device 306. Further, additional inventory information 324 may include data inserted or transmitted to a database 322 from one or more other devices.

In one configuration, the computing device 306 may have access to additional inventory information 324 over the network 304. In some configurations, in addition to running one or more queries and tasks on a local database 320, it may be beneficial to obtain additional queries 326, tasks 328, and inventory data 330 to add to the local inventory information 324. This may provide a more up-to-date database 320 with more current inventory information 352 on which to run the queries 314, 326. In some configurations, the computing device 306 may obtain the additional inventory information 324 and maintain data as local additional inventory 344 on a local database 320. Further, in some configurations, the computing device 306 may combine the inventory information 352 with any additional inventory information 324 and store or otherwise maintain the information as combined inventory information 346 on the local database 320.

In some configurations, the additional inventory information 324 may be part of a dynamically updated database 322 of data. For example, in some configurations, the database 322 may include an inventory backup 332. Where inventory information 324 continues to be added to the database 322, the database 322 may create one or more backups 334 of the additional inventory information 324. In some cases, the inventory backup 332 may include a backup 334 of a combination of inventory information 352 from the local database 320 and the additional inventory information 324. In some configurations, the backups 334 may contain backups of queries 326, tasks 328 and/or inventory data 330. In one example, the inventory backup 332 includes multiple backups A-N 334*a-n*. Each backup 332 may include recent version of the inventory data 312, additional inventory data 330 or compilation of inventory data. For example, backup A 334*a* may be a backup of the most recent compilation of inventory data. In that same example, backup N 334*n* may be an older compilation of inventory data. Further, the inventory backup 332 may include an inventory record specific to the computing device 306. In one configuration, the inventory backup 332 includes a last changed record 336. The last changed record 336 may be the most recent version of the inventory data 312 downloaded by the computing device 306 and stored on the local database 320. Some configurations of the database 322 may include multiple versions of the last changed record 336, either for multiple computing devices or tracking one or more downloads of inventory data 312.

In one example, a device may communicate with the database 322 to flag additional inventory information 324 to send to the computing device 306 upon demand. For example, where additional inventory data 330 is different from the last changed record 336 or inventory information 352 on the local database 320, an administrative core 302 or other computing device may flag inventory data as important for a specific computing device 306 and either send that data to the computing device 306 or prepare it for sending upon later request. In another example, the last changed record 336 may be used to flag additional inventory information 324 needed by the computing device 306 because it is new with respect to the last changed record 336.

In some configurations, the computing device 306 may be configured to compare a last changed record 336 or current copy of the inventory information 320 with additional inventory information 324. By comparing different inventory information, including queries, tasks and inventory data, the computing device 306 may determine whether a query 314 is a stale query, for example. A computing device 306 may determine that a query 314 is a stale query if certain criteria are met. For example, a query 314 may be a stale query if the query 314 is inactive or not current. In another example, a query 314 may be stale if the query 314 has not been updated or compared to a current database within a predetermined amount of time. In another example, a query 314 may be stale if it is not up to date with current inventory data 312. In another example, a query 314 may be stale if it is determined that there is a certain probability that the query will return an inaccurate record, based on a variety of factors. In yet another example, a query 314 may be stale if inventory data 312 corresponding to the query has changed since the last time the query was run. Other factors or combinations of different criteria may be used to determine whether or one or more queries 314 are stale queries.

If one or more queries are determined to be not stale, then the computing device 306 may already have access to a current query 314 and corresponding task 316 without having to access any external databases. In some configurations where the query 314 is determined to be not stale, a computing device 306 may obtain a query and task without ever communicating with another device over the network 304. In other configurations, by determining whether certain queries are not stale, a computing device 306 may limit the amount of additional inventory information 324 needed to run one or more queries on the inventory data 312. If one of the queries is determined to be stale, the computing device 306 may need to request or access another database 322 to receive additional inventory information 324. In another example, indication of a stale query may prompt the computing device 306 to download additional inventory information 324 and update the local database 320 with a more current version of the inventory information 352. In some configurations, where one or more queries are determined to have a mixture of stale and not stale queries, the computing device 306 may be configured to obtain and run the stale queries to obtain tasks corresponding to those queries.

In some configurations, the database 322 may be stored on or accessed by an administrative core 302. The administrative core 302 may include an application 308 having an inventory update module 340 and a backup module 342. In some configurations, rather than inventory updates and backups 334 being created and modified by one or more computing devices on the network 304, an application 308 on the administrative core 302 may perform these functions. For example, in one configuration, an inventory update module 340 may periodically update inventory information on the database 322. In another example, the inventory update module 340 updates inventory information in response to a request or policy received by the administrative core 302.

The application 308 may further include a backup module 342. In some configurations, the backup module 342 is configured to manage the inventory backup 332 on the database 322. For example, the backup module 342 may be configured to periodically create a backup 334 on the database 322. The backup module 342 may further be configured to create or manage the last changed record 336 assisting the computing device 306, administrative core 302 or other device on the network 304 to determine whether inventory information contains stale queries and whether additional inventory information 324 should be sent to a computing device 306.

The administrative core 302 may further comprise a core database 338 similar to other databases described herein. In some cases, the content described in relation to the database 322 may be stored or accessible from the core database 338 on the administrative core 302. In some configurations, the core database 338 may be similar to the database 322 described herein. Further, the core database 338, similar to the database 322 may be accessible by the computing device 306 for requesting and downloading inventory data 330 and other inventory information 324. In some configurations, the core database 338 may provide some or all of the inventory information 352 to later obtain and process locally on the computing device 306. In some configurations, the database 322 may be the core database 338 included in the administrative core 302.

In one configuration, the computing device 306 may determine that the inventory data 312 is incomplete or missing. Additionally or alternatively, the computing device 306 may request updates to the inventory data 312. In these cases, the computing device 306 may request a backup 334 or any amount of inventory information 324 via bulk or individual requests. In some cases, the administrative core 302 may process the queries 326 and provide tasks 328 to the computing device 306. While some or all of the processing is done by the administrative core 302 in these cases, queries are run on demand by a computing device 306 for specific queries 326 rather than for every possible query at frequent or periodic intervals like known systems.

Figure 4:
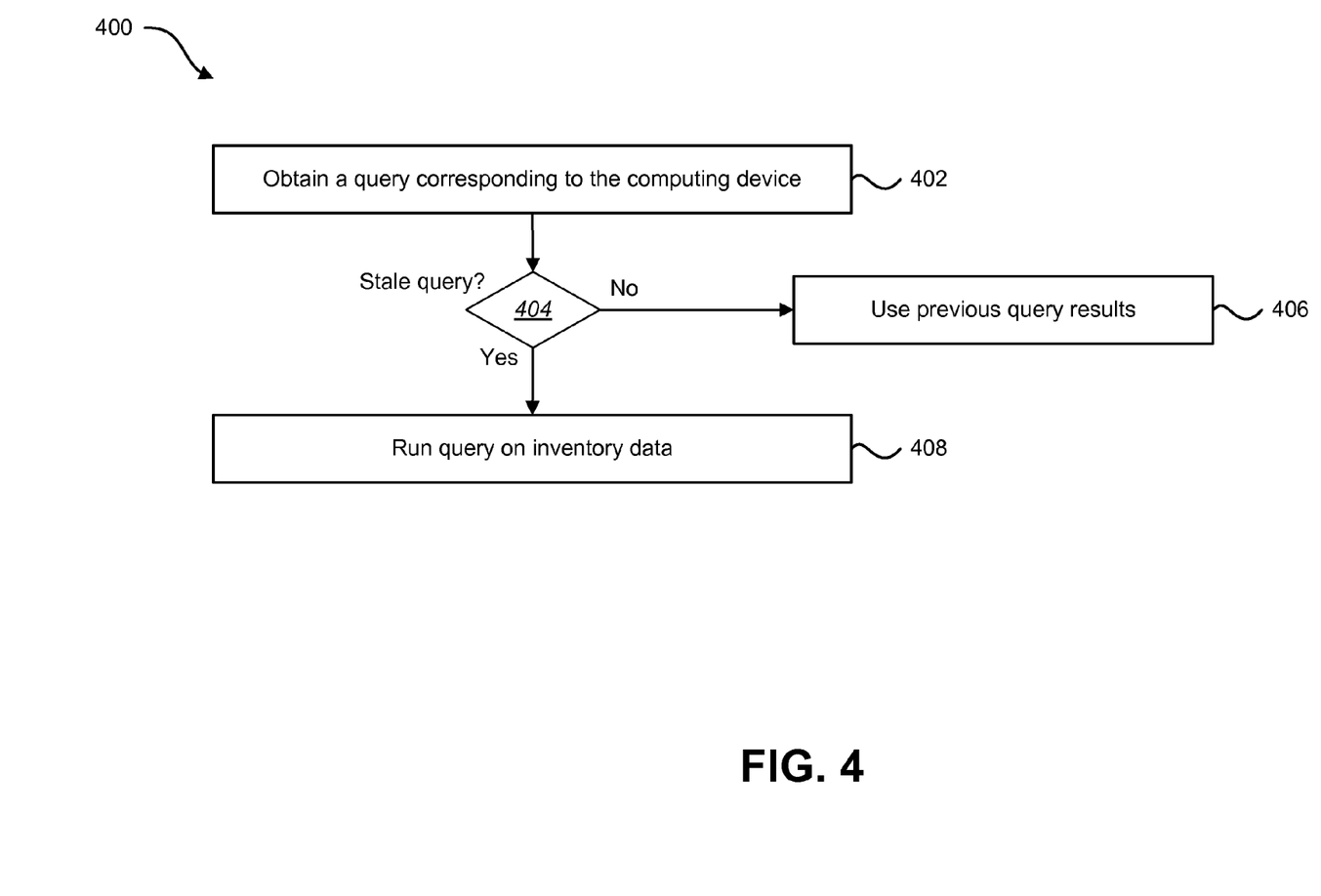
FIG. 4 is a flow diagram illustrating another configuration of a method where systems and methods for obtaining and running a local query on a computing device may be implemented.

FIG. 4 is a flow diagram illustrating another configuration of a method 400 where systems and methods for obtaining and running a local query 314 on a computing device 306 may be implemented. In one configuration, the computing device 306 obtains 402 a query 314 corresponding to the computing device 306. Some examples regarding obtaining one or more queries are given above.

In some configurations, the computing device 306 determines 404 whether a query 314 is stale or not. If a query 314 is not stale, then whichever query 314 is already accessible to or obtained previously by the computing device 306 is current. Without running the query 314, the computing device 306 may obtain a task 316 from inventory information 352 already on the computing device 306. In some configurations, the computing device 306 could simply use 406 the previous query results without running the query 314 again.

If the query 314 is determined to be a stale query, the computing device 306 may run 408 the query on the inventory data 312 on the computing device 306. In some cases, the computing device 306 will treat a stale query as an indication to request additional inventory data 330 or as a prompt to download a last changed record 336 or whatever information is needed to retrieve a non-stale query and run that query on inventory data 312. In some configurations, where one or more queries are being run, the computing device 306 may be configured to determine that some queries are stale while others are not stale. The computing device 306 may further be configured to run the non-stale queries while obtaining additional inventory information 324 to more effectively run the stale queries.

Figure 5:
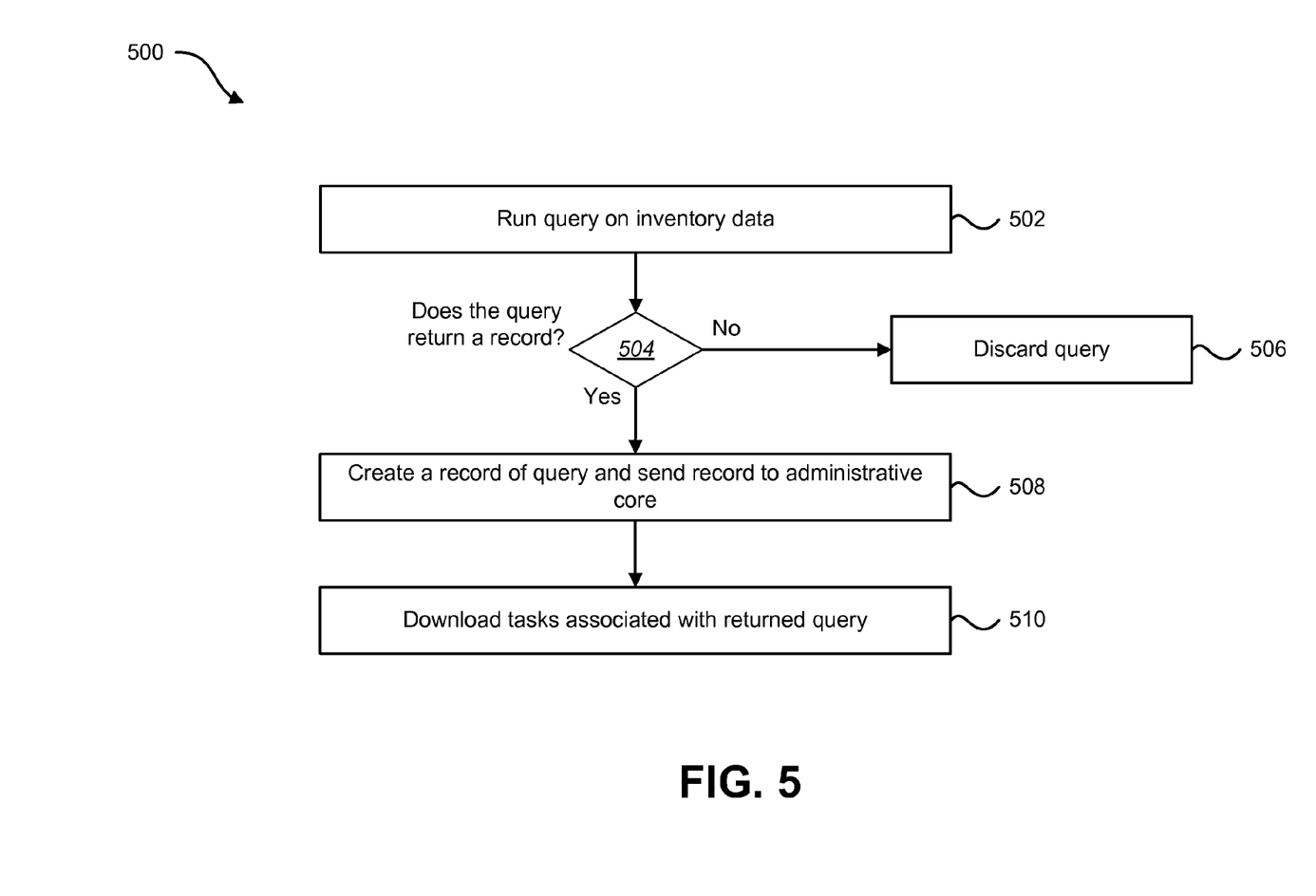
FIG. 5 is a flow diagram illustrating another configuration of a method where systems and methods for obtaining and running a local query on a computing device may be implemented.

FIG. 5 is a flow diagram illustrating another configuration of a method 500 where systems and methods for obtaining and running a local query 314 on a computing device 306 may be implemented. In one configuration, the computing device 306 runs 502 a query 314 on inventory data 312. A query 314 may include a scan, request, policy or other operation or inquiry applied to data, such as inventory data 312. Some examples of queries 314 are described above. Further, running a query 314 on inventory data 312 may be for a variety of reasons. The computing device 306 may determine 504 whether the query 314 returns a record. A record may be a piece of data or reference to data that satisfies a particular query 314. Further, a record may include a copy of or subset of inventory data 312 corresponding to a query 314. Some examples of records are described above.

In one configuration, if the query 314 fails to return a record, the computing device 306 discards 506 the query 314. In another configuration, the computing device 306 may send one or more records to another computing device, such as an administrative core 302. In another example, the computing device 306 may do nothing in response to failing to receive a record. In some configurations, the computing device 306 may perform one of many actions or processes in response to receiving a returned record. Conversely, if the query 314 returns a record, the computing device 306 may be configured to perform one of several predetermined responses. For example, in one configuration, the computing device 306 creates 508 a record of the response and sends the record of one or more responses to another device, such as an administrative core 302. In some configurations, the computing device 306, administrative core 302 or other device may store one or more records of query responses or respond by compiling one or more tasks corresponding to one or more queries 314. In one configuration, the computing device 306 downloads 510 a task 316 associated with the query 314 that returned a record. In some configurations, the computing device 306 downloads one or more tasks for each corresponding query to return a record.

Figure 6:
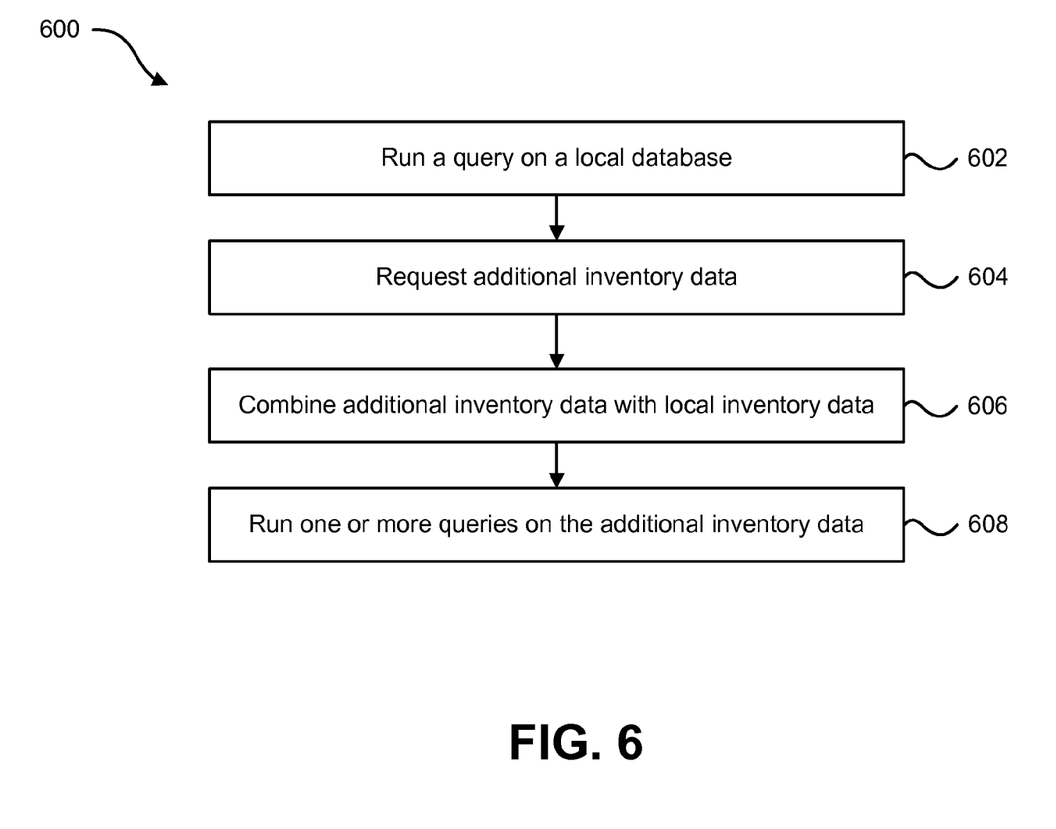
FIG. 6 is a flow diagram illustrating another configuration of a method where systems and methods for obtaining and running a local query on a computing device may be implemented.

FIG. 6 is a flow diagram illustrating another configuration of a method 600 where systems and methods for obtaining and running a local query 314 on a computing device 306 may be implemented. In one configuration, the computing device 306 runs 602 a query on a local database 320. As discussed in some detail herein, the local database 320 may include inventory data 312 about the computing device 306. In some configurations, the inventory data 312 may be previously downloaded from another device, such as an administrative core 302. In some configurations, the local database 320 may include some or all of the inventory data 312 related to the computing device 306.

In one configuration, the computing device 306 requests 604 additional inventory data 330. In some configurations, the request may be made to another device on the network 304. In one approach, the computing device 306 may request additional inventory data 330 from a database 322 accessible to the computing device 306. In another example, the computing device 306 may request additional inventory data 330 from an administrative core 302. The computing device 306 may combine 606 the additional inventory data 330 with the local inventory data 312. In some configurations, this may require updating inventory data 312 on the local database 320 to be consistent with the additional or new inventory data. In other configurations, the computing device 306 may add the additional inventory data 330 without changing or otherwise updating the local inventory data 312.

In one configuration, the computing device 306 runs 608 one or more queries on the additional inventory data 330. In some configurations, these queries run on the additional inventory data 330 may have been requested at the time of requesting the additional inventory data 330. In some configurations, the queries to run on the additional inventory data 330 may be one or more of the queries already stored on the local database 320. In another configuration, the computing device 306 may be configured to combine the additional inventory data 330 with the local inventory data 312 and run one or more queries on the combination of inventory data 312. In some configurations, the computing device 306 may be configured to determine whether each query is stale, possibly based on the differences between additional inventory information 324 and local inventory information 352. Some examples of determining whether queries are stale are described previously. In some configurations, the computing device 306 may be further configured to request one or more tasks corresponding to each query that returns a record, similar to other examples described herein.

Figure 7:
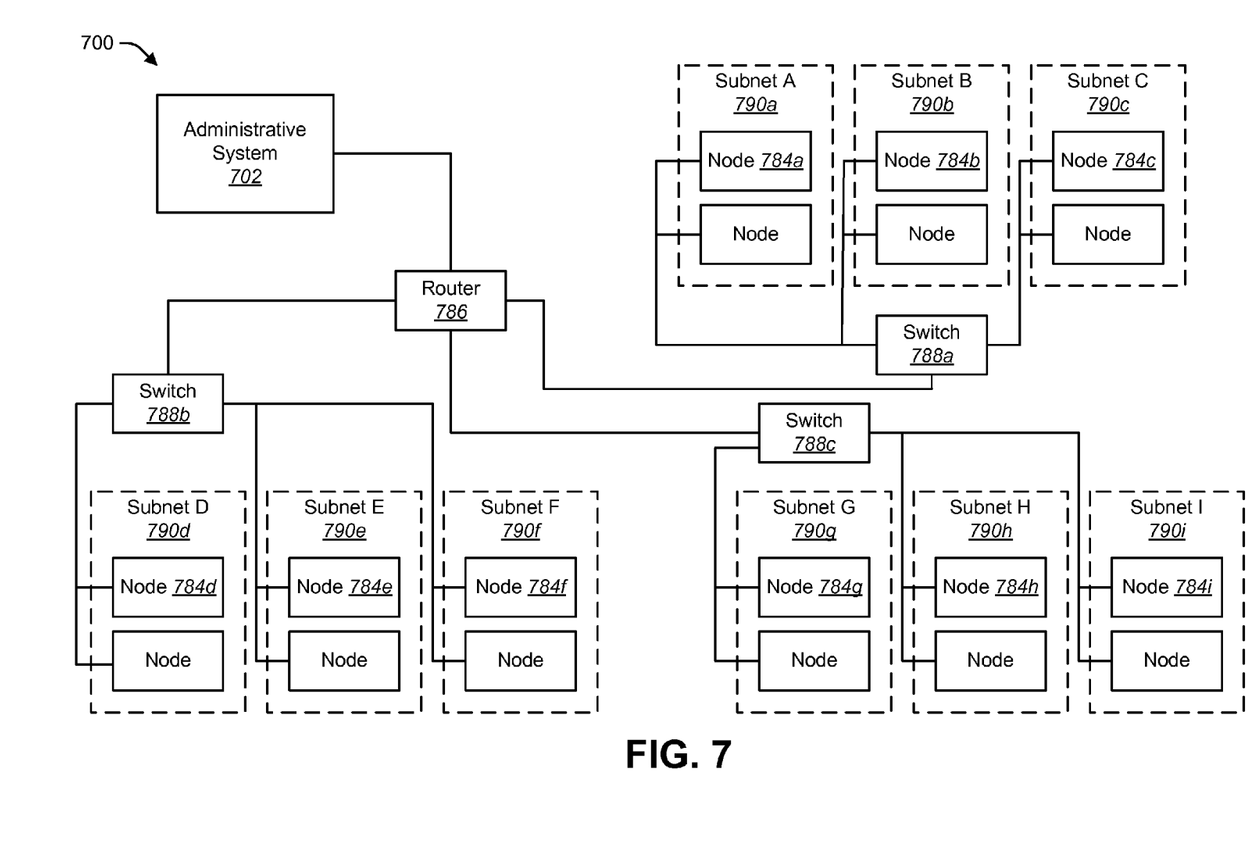
FIG. 7 is a block diagram that illustrates one configuration of a network where a system for obtaining and running a local query on a computing device may be implemented.

FIG. 7 is a block diagram that illustrates one configuration of a network where a system 700 for obtaining and running a local query on a computing device may be implemented. An administrative system 702 is connected to a router 786. The router 786 is connected to switches 788a, 788b, 788c. The switch 788a is connected to several nodes 784a, 784b, 784c, etc. via their respective subnets 790a, 790b, 790c. The switch 788b is connected to several nodes 784d, 784e, 784f, etc. via their respective subnets 790d, 790e, 790f. The switch 788c is connected to several nodes 784g, 784h, 784i, etc. via their respective subnets 790g, 790h, 790i. Although FIG. 7 only shows one router 786, and a limited number of switches 788, subnets 790 and nodes 784, many and varied numbers of routers 786, switches 788, subnets 790 and nodes 784 may be included in networks and/or systems where systems and methods for obtaining and running a local query on a computing device may be implemented. One or more of the nodes 784 illustrated in FIG. 7 may be examples of one or more of the computing devices 106, 306 or other devices 102, 302, 322 in communication with a network 104, 304 as described above. Further, the administrative system 702 may be an example of an administrative core 102, 302 as described above.

Figure 8:
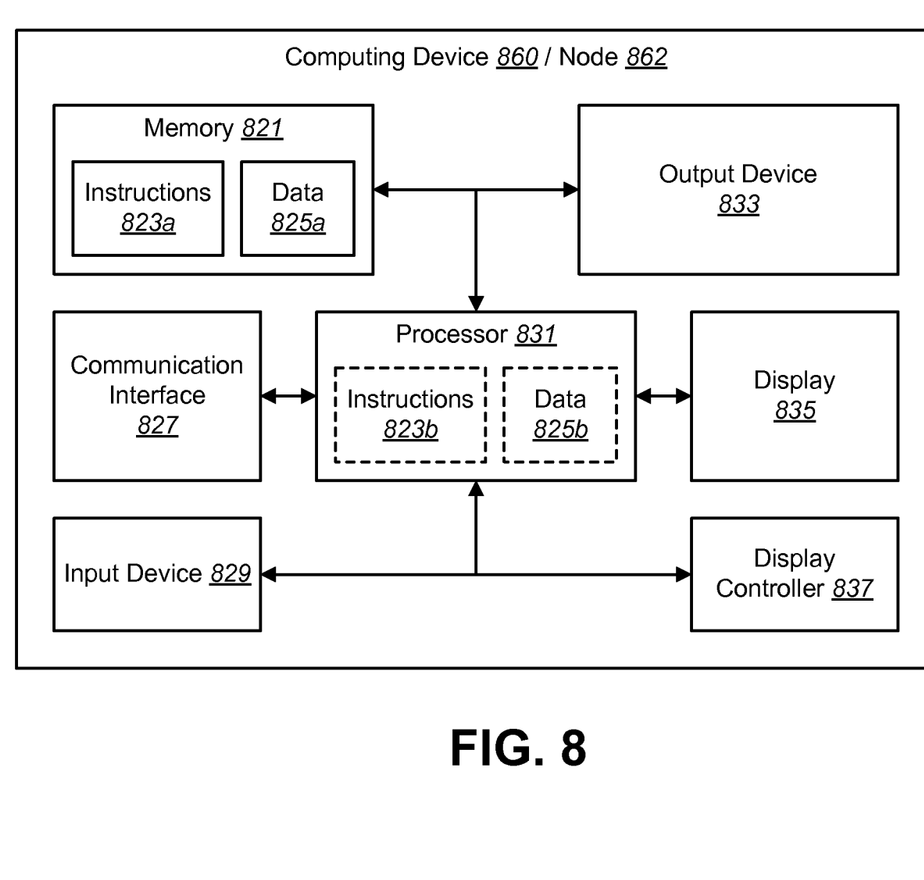
FIG. 8 is a block diagram that illustrates on configuration of a computing device and/or node that may be utilized for obtaining and running a local query.

FIG. 8 is a block diagram that illustrates one configuration of a computing device 860 and/or node 862 that may be utilized for running a local query on a computing device. The illustrated components may be located within the same physical structure or in separate housings or structures. One or more of the computing devices 106, 306, administrative systems and/or administrative cores 102, 302, 702 and other devices (e.g. database 322) described above may be implemented in accordance with the computing device 860 and/or node 862 illustrated in FIG. 8.

The computing device 860 and/or node 862 may include a processor 831 and memory 821. The memory 821 may include instructions 823a and data 825a. The processor 831 controls the operation of the computing device 860 and/or node 862 and may be, for example, a microprocessor, a microcontroller, a digital signal processor (DSP) or other device known in the art. The processor 831 typically performs logical and arithmetic operations based on program instructions 823b and/or data 825b it loads from the memory 821. The instructions 823a-b may be executable by the processor to implement one or more of the methods 200, 400, 500, 600 described above.

The computing device 860 and/or node 862 typically may include one or more communication interfaces 827 for communicating with other electronic devices. The communication interfaces 827 may be based on wired communication technology, wireless communication technology, or both. Examples of different types of communication interfaces 827 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The computing device 860 and/or node 862 typically may include one or more input devices 829 and one or more output devices 833. Examples of different kinds of input devices 829 include a keyboard, mouse, microphone, remote control device, button, joystick, trackball, touchpad, light-pen, etc. Examples of different kinds of output devices 833 include a speaker, printer, etc. One specific type of output device that may be typically included in a computer system is a display device 835. Display devices 835 used with configurations disclosed herein may utilize any suitable image projection technology, such as a cathode ray tube (CRT), liquid crystal display (LCD), light-emitting diode (LED), gas plasma, electroluminescence or the like. A display controller 837 may also be provided, for converting data stored in the memory 821 into text, graphics and/or moving images (as appropriate) shown on the display device 835.

Of course, FIG. 8 illustrates only one possible configuration of a computing device 860 and/or node 862. Various other architectures and components may be utilized.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EE- PROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The term "computer-readable medium" refers to any available medium that can be accessed by a computer or processor. A computer readable medium may be non-transitory and tangible. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A managed computing device configured for determining inventory information, comprising:
    a processor;
    memory in electronic communication with the processor; and
    instructions stored in memory, the instructions being executable to:
        obtain inventory data comprising computer hardware information, computer software information and update information;
        obtain a query from an administrative system accessible over a computer network, wherein the query corresponds to the managed computing device, and wherein the query comprises a Data Access Layer (DAL) query;
        determine, at the managed computing device, whether the query is stale, and if the query is stale, then: obtain a new query; and run the new query on the inventory data; and if the query is not stale, then: run the query on the inventory data;
        determine by the managed computing device whether running the query or the new query returns a record that comprises at least a subset of the inventory data, wherein the managed computing device stores, in a dynamic type schema, a local copy of the inventory data with at least one property or object that is determined after design time, wherein storing the local copy of the inventory data in the dynamic schema comprises storing the local copy of the inventory data in a table as one or more strings of data, wherein the managed computing device also stores a last changed record associated with every inventory attribute that is stored in the local copy of the inventory data; and
        obtain a task from the administrative system accessible over the computer network corresponding to the query or the new query based on whether a record that comprises at least a subset of the inventory data is returned.

2. The managed computing device of claim 1, wherein the instructions are further executable to store the inventory data on a local database of the managed computing device.

3. The managed computing device of claim 1, wherein obtaining inventory data comprises obtaining any additional inventory data, and wherein the instructions are further executable to run the query on any additional inventory data.

4. The managed computing device of claim 3, wherein the instructions are further executable to:
    obtain one or more additional queries; and
    run the one or more additional queries on any additional inventory data.

5. The managed computing device of claim 1, wherein obtaining inventory data comprises obtaining additional inventory data, and wherein the instructions are further executable to:
    combine the inventory data with the additional inventory data; and
    run the query on the combination of inventory data and additional inventory data.

6. The managed computing device of claim 5, wherein the instructions are further executable to:
    obtain one or more additional queries; and
    run the one or more additional queries on the combination of inventory data and additional inventory data.

7. The managed computing device of claim 1, wherein the inventory data is formatted in a dynamic type schema.

8. The managed computing device of claim 1, wherein the inventory data comprises metadata corresponding to the managed computing device, wherein the metadata maintains a similar data structure before and after the inventory data is obtained by the managed computing device.

9. A method for determining inventory data on a managed computing device, comprising:
    obtaining inventory data comprising computer hardware information, computer software information and update information;
    obtaining a query from an administrative system accessible over a computer network, wherein the query corresponds to the managed computing device, and wherein the query comprises a Data Access Layer (DAL) query;

determining, at the managed computing device, whether the query is stale, and if the query is stale, then: obtain a new query; and run the new query on the inventory data; and if the query is not stale, then: run the query on the inventory data;

determining by the managed computing device whether running the query or the new query returns a record that comprises at least a subset of the inventory data, wherein the managed computing device stores, in a dynamic type schema, a local copy of the inventory data with at least one property or object that is determined after design time, wherein storing the local copy of the inventory data in the dynamic schema comprises storing the local copy of the inventory data in a table as one or more strings of data, wherein the managed computing device also stores a last changed record associated with every inventory attribute that is stored in the local copy of the inventory data; and, obtaining a task from the administrative system accessible over the computer network corresponding to the query or the new query based on whether a record that comprises at least a subset of the inventory data is returned.

10. The method of claim 9, further comprising storing the inventory data on a local database of the managed computing device.

11. The method of claim 9, wherein obtaining inventory data comprises obtaining any additional inventory data, and wherein the method further comprises running the query on the additional inventory data.

12. The method of claim 11, further comprising:
obtaining one or more additional queries; and
running the one or more additional queries on the additional inventory data.

13. The method of claim 9, wherein obtaining inventory data comprises obtaining additional inventory data, and wherein the method further comprises:
combining the inventory data with the additional inventory data; and
running the query on the combination of inventory data and additional inventory data.

14. The method of claim 13, further comprising:
obtaining one or more additional queries; and
running the one or more additional queries on the combination of inventory data and additional inventory data.

15. The method of claim 9, wherein the inventory data is formatted in a dynamic type schema.

16. The method of claim 9, wherein the inventory data comprises metadata corresponding to the managed computing device, wherein the metadata maintains a similar data structure before and after the inventory data is obtained by the managed computing device.

17. A non-transitory tangible computer-readable medium for determining a managed computing device status comprising executable instructions for:

obtaining inventory data comprising computer hardware information, computer software information and update information;

obtaining a query from an administrative system accessible over a computer network, wherein the query corresponds to the managed computing device, and wherein the query comprises a Data Access Layer (DAL) query;

determining, at the managed computing device, whether the query is stale, and if the query is stale, then: obtain a new query; and run the new query on the inventory data; and if the query is not stale, then: run the query on the inventory data;

determining by the managed computing device whether running the query or the new query returns a record that comprises at least a subset of the inventory data, wherein the managed computing device stores, in a dynamic type schema, a local copy of the inventory data with at least one property or object that is determined after design time, wherein storing the local copy of the inventory data in the dynamic schema comprises storing the local copy of the inventory data in a table as one or more strings of data, wherein the managed computing device also stores a last changed record associated with every inventory attribute that is stored in the local copy of the inventory data; and obtaining a task from the administrative system accessible over the computer network corresponding to the query or the new query based on whether a record that comprises at least a subset of the inventory data is returned.

\* \* \* \* \*